3,635,926
AQUEOUS PROCESS FOR MAKING IMPROVED TETRAFLUOROETHYLENE / FLUOROALKYL PERFLUOROVINYL ETHER COPOLYMERS
William Franklin Gresham, Wilmington, Del., and Alfons Franz Vogelpohl, Washington, W. Va., assignors to E. I. du Pont de Nemours and Company, Wilmington, Del.
No Drawing. Filed Oct. 27, 1969, Ser. No. 869,871
Int. Cl. C08f 15/06, 3/24
U.S. Cl. 260—87.5 A    6 Claims

ABSTRACT OF THE DISCLOSURE

Tough, stable copolymers of tetrafluoroethylene monomer and fluorovinyl ether monomers can be produced by aqueous polymerization of the monomers by a process that requires that the reaction be carried out at from about 50 to about 110° C. in the presence of a water-soluble initiator such as ammonium persulfate, an emulsifying agent and a gaseous chain transfer agent such as hydrogen, methane or ethane.

BACKGROUND OF THE INVENTION

This invention relates to the polymerization of tetrafluoroethylene monomer and fluorovinyl ether monomer in an aqueous medium in the presence of a gaseous chain from dehydrogenation is relieved of potential catalyst transfer agent.

A major problem with tetrafluoroethylene/fluorovinyl ether (TFE/FVE) copolymers previously prepared in aqueous medium is their tendency to swell on being extruded through small orifices into tubes, wire coating, and the like. This swelling causes problems in dimension control of the finished parts but, worse than that, it causes excessive shrinkage of the parts when they are reheated near the melting point. High swelling resins have a highly shear stress dependent viscosity indicating a broad molecular weight distribution. The higher the swelling, the broader the molecular weight distribution at the same melt viscosity. The reason for this swelling is that the polymer is viscoelastic and some of the energy put in to cause flow results in elastic or recoverable deformation. It is this elastic recovery which causes the swelling of the polymer as it emerges in viscous flow from an orifice. A polymer with a broad molecular weight distribution contains, at equal melt viscosity, a larger proportion of very high molecular weight molecules (which have large elastic components) than a polymer with narrow molecular weight distribution. Thus, the former polymer would be expected to swell to a greater degree than the latter polymer. In certain applications of tetrafluoroethylene/fluorovinyl ether copolymers, it is highly desirable that the resin undergo little shrinkage when heated near its melting point. A specific embodiment of this invention on tetrafluoroethylene/fluorovinyl ether copolymers, prepared in aqueous medium in the presence of gaseous chain transfer agents such as methane, ethane and hydrogen, is their considerably reduced tendency to swell upon being extruded and subsequently to shrink when heated near their melting point. As was stated above, it is believed that the reduction in the swelling tendency of the copolymer prepared in the presence of these chain transfer agents is due to its narrower molecular weight distribution. Another advantage of the polymers of this invention is their improved toughness as indicated by their MIT flex life. The MIT flex life normally increases with melt viscosity and fluorovinyl ether content of the polymer. Thus, if the fluorovinyl ether content is held constant, the MIT flex life can be increased by increasing the melt viscosity of the polymer. Similarly, if the melt viscosity is held constant, the MIT flex life can be increased by increasing the fluorovinyl ether content of the polymer. We have found that the MIT flex life is increased for polymers with the same melt viscosity and fluorovinyl ether content when they are prepared in aqueous media in the presence of hydrogen, methane or ethane. It is believed that the increase in toughness of the polymers prepared in this manner is also due to their narrower molecular weight distribution relative to polymers prepared in the absence of a chain transfer agent. Melt viscosity is a function of both weight average and number average molecular weights while toughness is primarily a function of number average molecular weight. If the molecular weight distribution is narrowed, the ratio between weight average and number average molecular weight will be less. Thus, at the same melt viscosity, the polymers with a narrower distribution will have a higher number average molecular weight and consequently higher toughness. In certain applications of tetrafluoroethylene/fluorovinyl ether copolymers, it is highly desirable that the resins have high toughness but still have low enough melt viscosity ($1-100 \times 10^4$ poises) for easy fabrication and contain the minimum amount of the expensive fluorovinyl ether to be commercially attractive. This is particularly important in applications such as tank linings and thin walled tubing which require high stress crack resistance.

In U.S. patent application Ser. No. 818,391, it has been disclosed that TFE/FVE copolymers with the above described properties can be prepared in nonaqueous media in the presence of methanol. However, TFE/FVE polymers prepared in aqueous media in the presence of methanol do not exhibit the improved properties that are described in the above-mentioned patent application and in this patent application.

As discussed in U.S. Pat. No. 3,085,083, to Schreyer, carboxylate end-groups in the fluorocarbon polymer chain are the principle cause of the instability of fluorocarbon polymer at melt fabrication temperatures. Since acid fluoride end groups

are the result of the rearrangement of the fluorovinyl ether on the end of the growing chain, which takes place by the mechanism

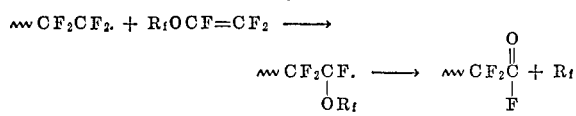

and since in an aqueous medium the acid fluoride groups are hydrolyzed to carboxylic acid end groups, it can easily be seen that this type of chain termination will result in polymer instability.

Since it is known that the number of unstable end groups formed on TFE/FVE copolymers decreases as the molecular weight increases, one would expect that decreasing the amount of initiator to produce high molecular weight polymer would decrease instability and increase the MIT flex life of the polymer. This of course happens, but there is also a large decrease in the ease of fabricability of the polymer. Addition of methane or hydrogen as a chain transfer agent to the polymerization recipe reduces the number of chain terminations that are made by rearrangements of the FVE monomer and increases the number of chain terminations such as those by the mechanism

where RH is a hydrogen containing chain transfer agent. The end groups formed by the chain transfer agent are stable hydride end groups (—CF$_2$H), the same end groups that result from the patented Schreyer humid heat treatment process. The resulting polymer has approximately the same number of unstable carboxylic acid end groups as a much higher molecular weight polymer made by an aqueous process without the chain transfer agent present.

Additional end group stability is introduced into the TFE/FVE copolymer by carrying out the aqueous copolymerization of the monomers in a medium buffered with ammonium carbonate. FVE monomer is resistant to hydrolysis in a basic aqueous medium but will form amide and ammonium salt groups which are very stable or heat degradable to stable end groups.

SUMMARY OF THE INVENTION

The invention consists of a conventional polymerization of TFE and FVE monomers in an aqueous medium in the presence of methane, ethane or hydrogen. The reaction is initiated by water-soluble initiators, such as ammonium persulfate, which are soluble in the solvent monomer solution. The polymerization is conducted at temperatures from about 50° C. to about 110° C., preferably at 70° C.–95° C., and is carried out in the presence of a gaseous hydrogen containing chain transfer agent.

The process by which the low swelling, melt fabricable aqueously prepared tetrafluoroethylene/fluoroalkyl perfluorovinyl ether (TFE/FVE) copolymer can be formed is as follows:

(a) Into a stirred autoclave containing water are charged ammonium carbonate and ammonium perfluorocaprylate, (b) Fluorovinyl ether monomer and a suitable gaseous chain transfer agent are charged into the autoclave, (c) The mixture of step (b) is adjusted to polymerization temperatures and tetrafluoroethylene monomer is charged to bring up the pressure in the system so the ratio of TFE monomer to FVE monomer is such so as to produce the desired copolymer, (d) The water-soluble free radical initiator is charged to the autoclave, (e) The pressure in the reactor is maintained throughout the reaction by continuously adding TFE to the autoclave to maintain the pressure. Other reactants can be added to maintain their concentrations, (f) The reaction is allowed to proceed until the desired solids level has been reached which is usually 10% to 30%. The autoclave is then dumped and the polymer recovered in the form of a dispersion.

A minor amount of fluorocarbon solvent can be added to the aqueous medium to enhance polymerization rates. Suitable fluorocarbon solvents for the process are perfluorinated solvents such as perfluorocyclobutane, perfluorodimethyl cyclobutane and perfluorocyclohexane. Preferred fluorocarbon solvents are commercially available chlorofluoroalkanes and some chlorofluorohydroalkanes having from 1–4 carbon atoms and preferably 1–2 carbon atoms. The solvents may be chlorofluoroalkanes in which each carbon atom is substituted by at least one fluorine atom. Said chlorofluoroalkanes may also contain a maximum of one hydrogen atom per carbon atom if the hydrogen is present only in the difluoromethyl grouping (—CF$_2$H). Suitable solvents must be liquid at polymerization conditions. Examples of preferred solvents are as follows: $CCl_2F_2$, $CCl_3F$, $CClF_2H$, $CCl_2FCCl_2F$, $CCl_2FCClF_2$ and $CClF_2CClF_2$. These compounds are sold under the trade names "Freon" 12, "Freon" 11, "Freon" 22, "Freon" 112, "Freon" 113 and "Freon" 114, respectively. The most preferred solvent is "Freon" 113. The polymer and initiator are not soluble in the fluoroalkane and since the initiator used is only soluble in water, the polymer is formed only in the aqueous medium.

The process can be used in polymerization of tetrafluoroethylene with comonomers that undergo rearrangement to form acid fluoride groups. One or more of the comonomers can be copolymerized or terpolymerized with tetrafluoroethylene to produce a copolymer or terpolymer. Examples of preferred monomers which can be copolymerized with tetrafluoroethylene are as follows: fluorovinyl ethers having the general formula $$XCF_2(CF_{2n}OCF=CF_2$$

where X=F or H and n=0–7 such as perfluoroethyl perfluorovinyl ether, perfluoropropyl perfluorovinyl ether, 3-hydroperfluoropropyl perfluorovinyl ether and isomers thereof; fluorovinyl polyethers having the general formula

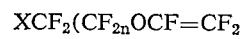

where X=F or H and n=0–7 and isomers thereof; and

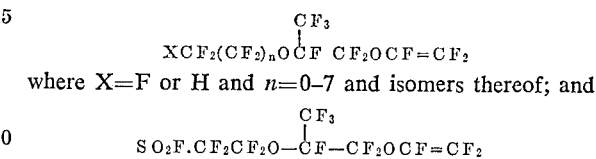

Initiators must be soluble in the aqueous medium and insoluble in the fluorocarbon solvent and have high activity between about 50° C. and 110° C. Suitable initiators are the inorganic peroxides such as ammonium persulfate and the water-soluble organic peroxides such as disuccinoyl peroxide. Rate of initiator decomposition will determine if initiator should be added at the beginning of the reaction or at spaced intervals during the reaction.

The polymerization also requires the presence of a dispersing agent. It has been found that the ammonium salts of long chain perfluorocarbon acids such as ammonium perfluorocaprylate are preferred for this polymerization.

Carboxylic acid end groups in the polymer are termed "unstable end groups" because they decompose readily, during fabrication of the polymer, giving rise to bubbles in the finished product. Other end groups such as vinyl end groups are also included in the category of unstable end groups because they are readily converted to carboxylic acid end groups. When the polymerization is buffered with ammonium carbonate, most of the carboxylic end groups are converted to stable amide end groups.

The term "specific melt viscosity" as used herein means the apparent melt viscosity as measured at 380° C. under a shear stress of 6.5 pounds per square inch. Specific melt viscosity is determined by using a melt indexer of the type described in ASTM D–1238–52–T, modified for corrosion resistance to embody a cylinder, orifice, and a piston made of Stellite (cobalt-chromium-tungsten alloy). The resin is charged to the 0.375 inch I.D. cylinder which is held at 380° C.±0.5° C. allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute.

Due to the high molecular weight and insolubility of the tetrafluoroethylene/fluoroalkyl-perfluorovinyl ether copolymers, the measurement of their molecular weight distributions by classical methods is impossible. Instead, we have devised a test to measure the tendency of resins to swell upon being extruded which we believe to be related to molecular weight distribution as already discussed above. The "Percent Swelling" is determined during the measurement of melt viscosity by the procedure previously described. The diameter of the strand excluded from the orifice of the melt indexer is measured after cooling to room temperature and compared with the diameter of the orifice. The "Percent Swelling" is the increase in diameter of the extruded strand versus the diameter of the orifice as indicated by the equation below.

$$\text{"Percent Swelling"} = \left[\frac{D_E}{D_D} - 1\right] 100$$

where $D_E$ = Diameter of extrudate
$D_D$ = Diameter of orifice

The "Percent Swelling" is also directly proportional to the extrusion rate through the orifice. Under the conditions of the test, the extrusion rate decreases as the melt viscosity increases. This results in the "Percent Swelling" showing an apparent decrease as the melt viscosity is increased. Thus, in order to compare the "Percent Swelling" of two polymers, their melt viscosities should be relatively equal.

For many applications it is desirable that the "Percent Swelling" be less than 25. Previous tetrafluoroethylene/ fluorovinyl ether copolymers had "Percent Swelling" in excess of 50. Polymers prepared in the presence of gaseous chain transfer agents have "Percent Swelling" less than 25 and usually less than 20.

The range of melt viscosities that are useful and over which an improvement is observed using this process is 0.5 to $500 \times 10^4$ poises, with 1 to $100 \times 10^4$ poises being preferred.

MIT flex life and swelling are controlled in aqueously prepared TFE/FVE copolymers only by gaseous chain transfer agents. Effective gaseous chain transfer agents are hydrogen and the lower alkanes. Preferred chain transfer agents are hydrogen, methane and ethane with methane being the most preferred because of its lower activity than ethane and other lower alkanes. Activity increases with molecular weight. Gaseout chain transfer agents are unique in an aqueous system to provide polymers with improved toughness and reduced tendency to swell. Gaseous means being in the vapor phase at reaction temperatures and pressures. Amounts of gaseous chaing transfer agent that must be added range from about 1 to about 500 p.s.i.g. with the preferred range being from about 1 to about 150 p.s.i.g.

The foregoing process will be exemplified in the following examples:

EXAMPLE I

Into a clean, stainless steel, horizontal, agitated autoclave having a volume of 6200 cc. are placed 6 grams of ammonium persulfate (APS) and 10 grams of an ammonium perfluorocaprylate ($C_8$APFC). The autoclave was closed, evacuated and purged 3 times with tetrafluoroethylene, evacuated, and into it were sucked 3440 ml. of distilled, demineralized water and 75 grams of perfluoropropyl vinyl ether (PPVE). The agitator was turned on and the contents heated to 70° C. Tetrafluoroethylene monomer was introduced and maintained at 250 p.s.i.g. while agitating at 125 r.p.m. After 18 minutes the reaction was stopped by venting the unreacted monomer. The coagulated polymer was removed and dried at 125° C. Analysis of the polymer by infrared spectroscopy showed it contained 2.2 wt. percent PPVE. Its melt viscosity at 380° C. was $2014 \times 10^4$ poises as determined using a 5 kg. weight. The need for a chain transfer agent to lower molecular weight is illustrated by this control run.

EXAMPLES II–VI

The conditions for Examples II–VI are summarized in Table I. These were run in the method of Example I. Chain transfer agent was added to the autoclave in addition to the other reactants. These examples form the baseline for comparison with the hydrogen and methane runs which follow.

EXAMPLE VII

Charged to the same autoclave as described in Example I were 6 grams APS, 10 gm. $C_8$APFC, 15 gm. $(NH_4)_2CO_3 \cdot H_2O$. Sucked into the autoclave were 60 gm. of PPVE comonomer, 300 ml. "Freon" F–113, and 4200 ml. distilled, demineralized water. After heating to 70° C., the autoclave was pressured first to 40 p.s.i.g. with hydrogen and then to 290 p.s.i.g. with TFE. Conditions were maintained for 21 minutes The resulting dispersion contained 17.1 wt. percent solids which after drying had the following properties: melt viscosity=$4.4 \times 10^4$ poises, melt expansion=22%, wt. percent PPVE=3.05.

EXAMPLES VIII–XVII

These examples using hydrogen and methane as chain transfer agents were performed as in Example VII above and they are summarized in Table I.

EXAMPLE XVIII

To the autoclave used in the Example I were charged 10 grams of $C_8$APFC and 15 grams of $(NH_4)_2CO_3 \cdot H_2O$. Sucked into the evacuated autoclave were 45 grams of PPVE comonomer, 300 ml. of "Freon" F–113, and 4200 ml. of distilled, demineralized water. After heating to 90° C., the autoclave was pressured with 50 p.s.i. of methane, then brought to 350 p.s.i.g. with TFE Initiator solution was pumped in, so as to add 0.10 gram of APS initially, with an addition of 1.37 mg./min. continuously thereafter. During the run, an additional 40 p.s.i. of methane and 25 ml. of PPVE were added. After 95 minutes, the dispersion contained 29.2% solids with the following properties: melt viscosity=$8.4 \times 10^4$ poise, PPVE content=3.18 wt. percent, and melt expansion=4.8%.

EXAMPLE XIX

In the method of Example I, 5 grams of $C_8$APFC and 15 grams of $(NH_4)_2CO_3 \cdot H_2O$ were charged to the autoclave. After evacuating the clave, 60 grams of PPVE, 300 ml. of "Freon" F–113, and 4200 ml. of water were sucked in. After heating to 80° C., 3 p.s.i. of ethane were added, then the autoclave was pressured to 300 ps.i.g with TFE. Initiator solution was pumped in; initially 010 grams of APS, then continuously at 1.37 mg./min. During the run, an additional 1 p.s.i. of ethane and 15 ml. of PPVE were added. After 60 minutes, the dispersion contained 221% solids with the following properties: melt viscosity=10.6 $\times 10^4$ poise, PPVE content=2.59 wt. percent, and melt expansion=1.2%.

The invention claimed is:
1. In a process for copolymerizing tetrafluoroethylene monomer and fluorovinyl ether monomer to a solid copolymer comprising the steps of
   (a) forming a pressurized mixture of water, buffer, dispersing agent, fluorovinyl ether monomer, liquid chain transfer agent and tetrafluoroethylene monomer in an autoclave;
   (b) polymerizing said fluorovinyl ether monomer and tetrafluoroethylene monomer at from 50° C. to about 110° C. with a free radical initiator while maintaining the pressure in said autoclave by addition of tetrafluoroethylene monomer to form a copolymer having a melt viscosity of from about 0.5 to about $500 \times 10^4$ poises; and
   (c) recovering the copolymer formed in step (b),
the improvement comprising mixing about 1–500 p.s.i.g. of a gaseous chain transfer agent to the mixture of step (a) in place of the liquid chain transfer agent to cause the copolymer produced in step (b) to have a percent Swelling of less than 25, as calculated by the formula,

$$\text{Percent Swelling} = \left[ D_E / D_D - 1 \right] 100$$

where $D_E$ = diameter of extrudate and $D_D$ = diameter of extrusion orifice.

2. The improved process of claim 1 in which a further improvement comprises adding to the mixture of step (a) a fluorocarbon solvent.

3. The process of claim 2 in which the fluorocarbon solvent is selected from the group of fluorocarbon solvents consisting of $CCl_2F_2$, $CCl_3F$, $CClF_2H$, $CCl_2FCCl_2F$, $CCl_2FCClF_2$ and $CClF_2CClF_2$, the fluorovinyl ether monomer is selected from the group of fluorovinyl ether monomers, consisting of fluorovinyl ethers having the general formula $XCF_2(CF_2)_nOCF=CF_2$ where X=F or H and n=0–7 such as perfluoroethyl perfluorovinyl ether, perfluoropropyl perfluorovinyl ether, 3-hydroperfluoropropyl perfluorovinyl ether and isomers thereof; fluorovinyl polyethers having the general formula

where X=F or H and n=0–7 and isomers thereof; and $$SO_2F.CF_2CF_2O-\underset{|}{C}F-CF_2OCF=CF_2,$$
with $CF_3$ above the central C, the free radical initiator is selected from the group of free radical initiators consisting of inorganic peroxides and water-soluble organic peroxides, the dispersing agent is an ammonium salt of a perfluorocarbon acid and the gaseous chain transfer agent is selected from the group of gaseous chain transfer agents consisting of hydrogen, methane and ethane.

4. The process of claim 3 in which the fluorocarbon solvent is $CCl_2FCClF_2$, the fluorovinyl ether monomer is perfluoropropyl perfluorovinyl ether, the initiator is ammonium persulfate, the dispersing agent is ammonium perfluorocaprylate and the gaseous chain transfer agent is methane.

5. The process of claim 4 in which the gaseous chain transfer agent is hydrogen.

6. The process of claim 4 in which the gaseous chain transfer agent is ethane.

References Cited
UNITED STATES PATENTS 3,066,122  11/1970  Brinker et al. _____ 260—87.5 A

FOREIGN PATENTS 953,098  Great Britain.

JOSEPH L. SCHOFER, Primary Examiner

J. A. DONAHUE, JR., Assistant Examiner